US012752232B2

(12) United States Patent
Russell et al.

(10) Patent No.: US 12,752,232 B2
(45) Date of Patent: Oct. 6, 2026

(54) CONTACTOR ASSEMBLY AND SORBENT CARTRIDGE HAVING SORBENT BED FOR CONTACTOR ASSEMBLY

(71) Applicant: Mosaic Materials, Inc., Alameda, CA (US)

(72) Inventors: Steven Russell, The Woodlands, TX (US); James Storey, Houston, TX (US); Claudia Leon, Houston, TX (US); Aaron Avagliano, Tomball, TX (US); John Battaglioli, Ballston Lake, NY (US); Dustin Kraft, Houston, TX (US); Graham Wenz, Richmond, CA (US)

(73) Assignee: MOSAIC MATERIALS, INC., Alamenda, CA (US)

( * ) Notice: Subject to any disclaimer, the term of this patent is extended or adjusted under 35 U.S.C. 154(b) by 330 days.

(21) Appl. No.: 18/407,863

(22) Filed: Jan. 9, 2024

(65) Prior Publication Data

US 2024/0226795 A1 Jul. 11, 2024

Related U.S. Application Data

(60) Provisional application No. 63/438,143, filed on Jan. 10, 2023.

(51) Int. Cl.
*B01D 53/04* (2006.01)

(52) U.S. Cl.
CPC .... *B01D 53/0415* (2013.01); *B01D 2257/504* (2013.01)

(58) Field of Classification Search
CPC .......................... B01D 53/04; B01D 53/0414; B01D 53/0446; B01D 2257/504; Y02C 20/40

(Continued)

(56) References Cited

U.S. PATENT DOCUMENTS

| | | | | |
|---|---|---|---|---|
| 2,727,585 A * | 12/1955 | Zankey | .............. | B01D 53/0438 96/129 |
| 3,025,233 A * | 3/1962 | Figert | ...................... | B01J 20/08 210/502.1 |

(Continued)

FOREIGN PATENT DOCUMENTS

| | | |
|---|---|---|
| KR | 101509389 B1 | 4/2015 |
| WO | 2021239747 A1 | 12/2021 |

OTHER PUBLICATIONS

International Search Report and Written Opinion; PCT/US2024/010869; Mailed May 14, 2024; Korean Intellectual Property Office; 8 pages.

(Continued)

*Primary Examiner* — Frank M Lawrence, Jr.
(74) *Attorney, Agent, or Firm* — CANTOR COLBURN LLP

(57) ABSTRACT

A contactor assembly configured to capture $CO_2$ from a fluid flow, the contactor assembly including a sorbent bed, the sorbent bed including a $CO_2$ adsorbent material and having a first end and a second end, wherein a thickness of the sorbent bed is varied between the first end and the second end. A method of reducing pressure drop of fluid flow through the contactor assembly includes arranging a sorbent cartridge in the contactor vessel, the sorbent cartridge having the sorbent bed. A sorbent cartridge configured for insertion in a contactor vessel includes a sorbent bed having a $CO_2$ adsorbent material, a first end, a second end, a thickness of the sorbent bed at the first end being less than a thickness of the sorbent bed at the second end.

14 Claims, 14 Drawing Sheets

(58) Field of Classification Search
USPC .............. 95/139; 96/108, 121, 129; 423/230
See application file for complete search history.

(56) References Cited

U.S. PATENT DOCUMENTS

| | | | | |
|---|---|---|---|---|
| 4,077,779 | A * | 3/1978 | Sircar | C01B 3/56 95/143 |
| 4,220,553 | A * | 9/1980 | Krause | B01J 20/2803 96/135 |
| 4,698,072 | A * | 10/1987 | Rohde | B01J 8/0415 95/143 |
| 5,626,763 | A * | 5/1997 | Mathews | B01J 47/022 210/660 |
| 7,407,553 | B2 | 8/2008 | Jung et al. | |
| 8,157,892 | B2 | 4/2012 | Meirav | |
| 8,690,999 | B2 | 4/2014 | Meirav et al. | |
| 10,029,205 | B2 | 7/2018 | Sundaram et al. | |
| 10,143,959 | B2 | 12/2018 | Meirav et al. | |
| 10,232,305 | B2 | 3/2019 | Gebald et al. | |
| 10,449,479 | B2 * | 10/2019 | Sundaram | B01D 53/0473 |
| 11,007,470 | B2 | 5/2021 | Wurzbacher et al. | |
| 11,446,601 | B2 | 9/2022 | Sundaram et al. | |
| 2003/0140793 | A1 * | 7/2003 | Lacey | B01D 53/261 96/108 |
| 2005/0045041 | A1 * | 3/2005 | Hechinger | B01D 53/047 96/121 |
| 2009/0013973 | A1 * | 1/2009 | Yamasaki | F02M 25/0854 123/519 |
| 2010/0288704 | A1 | 11/2010 | Amsden et al. | |
| 2011/0198055 | A1 | 8/2011 | Meirav et al. | |
| 2011/0206572 | A1 | 8/2011 | Mckenna | |
| 2012/0216676 | A1 | 8/2012 | Addiego et al. | |
| 2012/0222500 | A1 | 9/2012 | Riess et al. | |
| 2013/0263740 | A1 * | 10/2013 | Mani | B01D 53/0407 96/112 |
| 2017/0197174 | A1 * | 7/2017 | Nishibe | B01D 53/08 |
| 2019/0105597 | A1 | 4/2019 | Meirav et al. | |
| 2022/0176310 | A1 | 6/2022 | Suter et al. | |
| 2022/0193598 | A1 | 6/2022 | Suter et al. | |
| 2022/0362737 | A1 | 11/2022 | Staufcik et al. | |
| 2022/0370950 | A1 | 11/2022 | Weston et al. | |
| 2024/0001284 | A1 * | 1/2024 | Cully | B01D 53/0438 |

OTHER PUBLICATIONS

Lively et al., "Hybridizing heat-integrated 3D printed modules with mass manufacturable, low pressure drop fiber sorbents," National Energy Technology Laboratory; Georgia Tech Research Corporation; Dec. 2021; 36 pages.

* cited by examiner

CONTACTOR ASSEMBLY AND SORBENT CARTRIDGE HAVING SORBENT BED FOR CONTACTOR ASSEMBLY

CROSS REFERENCE TO RELATED APPLICATIONS

This application claims the benefit of an earlier filing date from U.S. Provisional Application Ser. No. 63/438,143 filed Jan. 10, 2023, the entire disclosure of which is incorporated herein by reference.

BACKGROUND

Fossil fuel combustion generates and releases large amounts of carbon dioxide ("CO2") into the Earth's atmosphere. To slow the rate of CO2 emissions, large emitters, such as coal and natural gas power plants, can be made to capture the CO2 before it is emitted into the atmosphere. However, removal of carbon dioxide (CO2) from gas streams is not limited to such large emitters, and is becoming increasingly common and sometimes required across many industrial sectors, as well as in ambient air and point source carbon capture from any industrial source, with selection of removal technology being driven by the application, the CO2 concentration and the pressure of the feed. Removing carbon dioxide from ambient air for harvesting, sequestration or utilization is also known as direct air capture (DAC) and has become an active area of research by many for climate change mitigation. While there are various approaches for carbon dioxide removal from air (both breathable and ambient), regenerable solid-sorbent systems have emerged as an attractive method for dilute carbon dioxide removal from air, but existing systems still exhibit poor performances.

One focus for the development of CO2 removal has been on the development of various adsorbents used to bind the CO2 from a fluid stream. Adsorbent material acts like a high-capacity molecular sponge to selectively capture CO2. There are a few different classes of solid sorbents capable of adsorbing dilute carbon dioxide, with the most widely used class being amine-functionalized solid adsorbents because the presence of strongly basic amine groups within pores endows the materials for selectivity for carbon dioxide even in the presence of water. While traditional amine-functionalized solids are a functional technology for removing dilute carbon dioxide from humid ambient or breathable air, they demonstrate relatively modest working capacities. These low working capacities lead to increased energy and time requirements for regeneration of large system sizes. Accordingly, more effective materials that can adsorb ranges of carbon dioxide from low ambient levels typical of enclosed life support systems to industrial applications where the levels are significantly higher are being investigated, including zeolites, mesoporous silicas, and metal-organic framework (MOFs) adsorbents. Amine-appended MOFs, in particular, shows promise for the improved removal of carbon dioxide across several orders of magnitude of concentration from near ambient conditions (e.g., naturally occurring levels) to industrial levels where the carbon dioxide is present at levels in excess of 10,000 ppm.

Both carbon capture of emissions from power and industrial facilities, as well as carbon dioxide removal such as DAC will be needed to meet climate goals and emission reduction targets. Creating economical, scalable and energy efficient DAC systems that can effectively capture CO2 from the atmosphere is important for supply into the CO2 utilization market, including eFuels. Significantly and efficiently reducing as well as eliminating CO2 across multiple industries including hard-to-abate sectors is needed. DAC can work in tandem with emissions controls to lower the aggregate amount of CO2 that is emitted. While emissions capture and improved energy efficiency at industrial sites can reduce current greenhouse gases, DAC can also cut legacy emissions in the atmosphere.

Despite the many benefits and potential applications of DAC, the process requires significant improvements in the areas of efficiency, reliability, ease of maintenance, and cost to become more widely adopted.

SUMMARY

An embodiment of a contactor assembly configured to capture CO2 from a fluid flow, the contactor assembly including a sorbent bed, the sorbent bed including a CO2 adsorbent material and having a first end and a second end, wherein a thickness of the sorbent bed is varied between the first end and the second end.

An embodiment of a method of reducing pressure drop of fluid flow through the contactor assembly, the contactor assembly having a contactor vessel including a first face arranged to receive the fluid flow and a second face, the method including arranging a sorbent cartridge in the contactor vessel, the sorbent cartridge including the sorbent bed, arranging the sorbent cartridge including positioning the first end of the sorbent bed adjacent the first face of the contactor vessel and positioning the second end of the sorbent bed adjacent the second face of the contactor vessel, wherein the fluid flow received in the sorbent cartridge passes through the sorbent bed and exits through the second face.

An embodiment of a contactor assembly configured to capture CO2 from a fluid flow, the contactor assembly including a sorbent bed, the sorbent bed including a CO2 adsorbent material and having a first end and a second end, a contactor vessel configured to removably support the sorbent bed therein, the contactor vessel having a first face arranged to receive the fluid flow and a second face, wherein the first end of the sorbent bed is arranged adjacent the first face of the contactor vessel and the second end of the sorbent bed is arranged adjacent the second face of the contactor vessel, and at least one inner wall within the contactor vessel configured to divide the contactor vessel into a plurality of compartments, wherein the contactor vessel is sized to receive a plurality of the sorbent beds within each compartment.

An embodiment of a sorbent cartridge configured for insertion in a contactor vessel, the sorbent cartridge including a sorbent bed, the sorbent bed including a CO2 adsorbent material, a first end, and a second end, wherein a thickness of the sorbent bed at the first end is less than a thickness of the sorbent bed at the second end.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
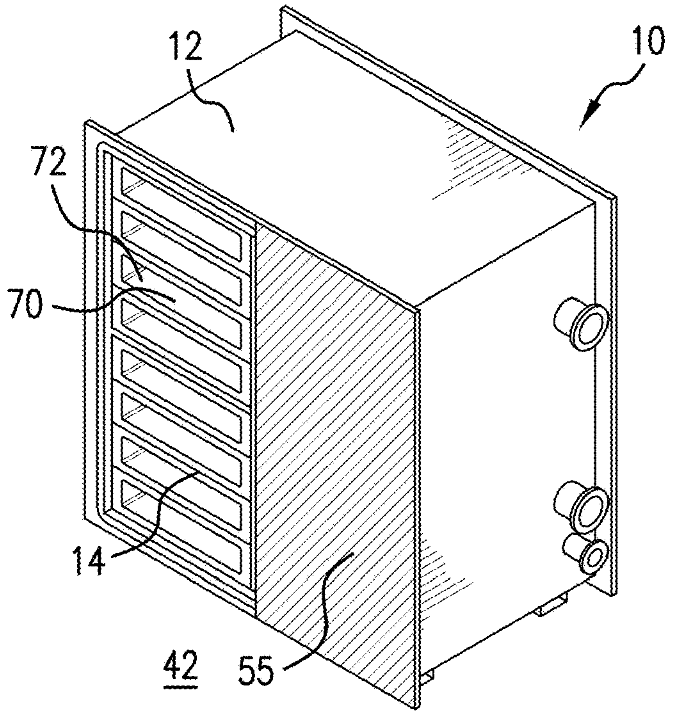
FIG. 1 depicts a front perspective view of an embodiment of a contactor assembly.
Figure 2:
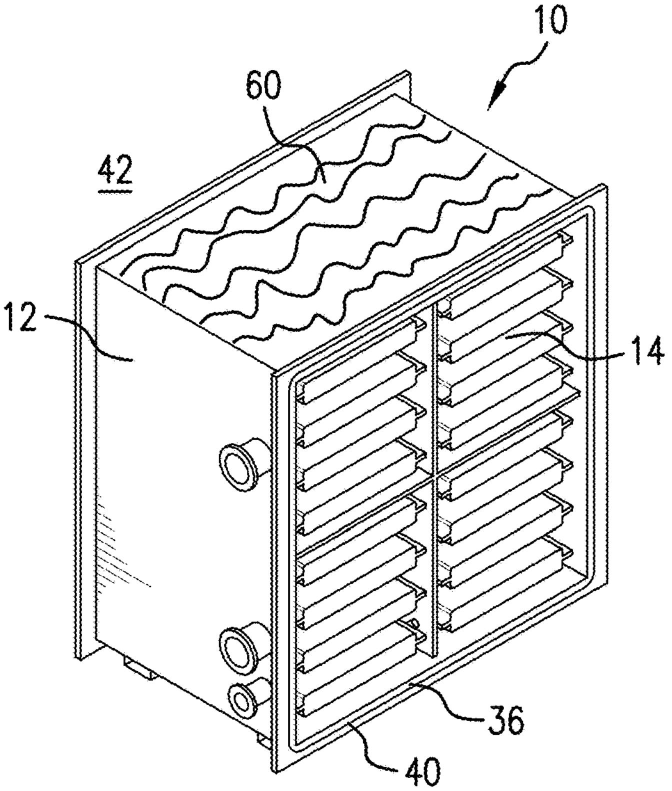
FIG. 2 depicts a rear perspective view of the contactor assembly of FIG. 1.

With reference to FIGS. 1 and 2, front and rear views of one embodiment of a contactor assembly 10 are shown. The contactor assembly 10 is employable as an air contactor assembly for capture of CO2 from a gas stream. The contactor assembly 10 includes a contactor vessel 12 and one or more sorbent bed cartridges 14.

Figure 3:
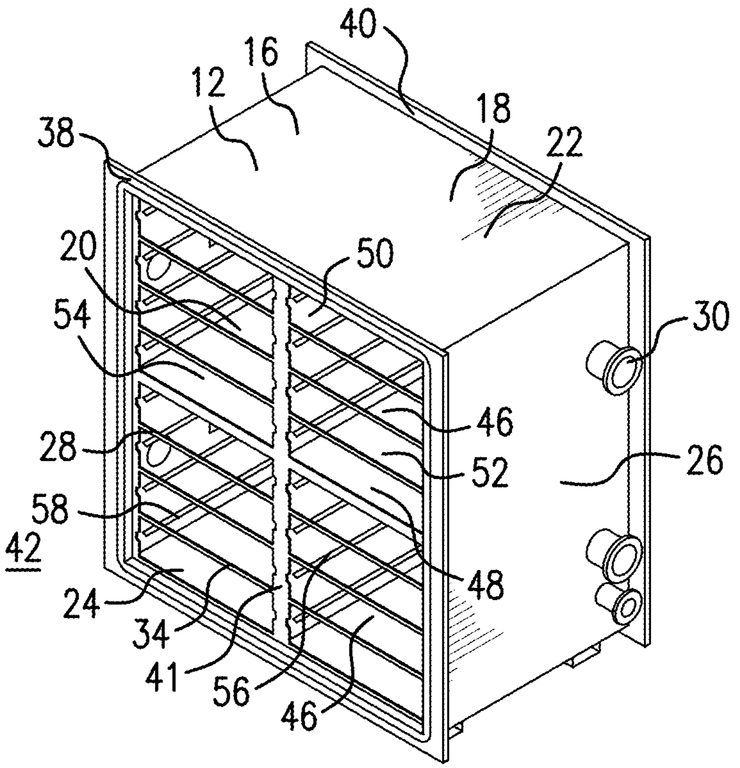
FIG. 3 depicts a front perspective view of an embodiment of a contactor vessel of the contactor assembly of FIG. 1.

The contactor vessel 12 is shown in FIG. 3 without the sorbent bed cartridges 14 installed. The contactor vessel 12 includes an outer frame 16 having one or more outer walls 18 that partially enclose an interior 20 of the vessel 12. In the illustrated embodiment, the outer walls 18 of the outer frame 16 includes a first outer wall 22, depicted as a top outer wall, an opposing second outer wall 24, depicted as a bottom outer wall, a third outer wall 26, and an opposing fourth outer wall 28. While the illustrated embodiment includes four outer walls 18, the outer frame 16 may have a cross-section with more than four outer walls 18 or less than four outer walls 18. By example only, the outer frame 16 could have a hexagonal cross-section with six outer walls 18, or a circular cross section with a single substantially continuous outer wall 18. One or more of the outer walls 18 may include one or more apertures 30 for providing vacuum pressure, heat introduction, pressure release, water drains, and other functions for operating the contactor assembly 10. In the illustrated embodiment, both the third outer wall 26 and the fourth outer wall 28 include apertures 30.

The contactor vessel 12 further includes a first face 34 and an opposing second face 36 (FIG. 2) that are separated by the outer frame 16. In a method of utilizing the contactor assembly 10 for the purpose of capturing CO2, fluid flow is introduced or otherwise present at the first face 34 and exits through the second face 36, as will be further described below. For carbon capture, such as but not limited to DAC, the fluid of the fluid flow is air, such as ambient air. In some embodiments, the fluid flow can utilize a fan or other fluid directing instrumentation upstream or downstream (in case of vacuum pull from face 36) of the contactor vessel 12 to direct the fluid flow towards the first face 34. More particularly, in the illustrated embodiment, the first face 34 is a front side or inflow side of the contactor assembly 10 while the second face 36 is a rear side or outflow side of the contactor assembly 10. In some embodiments, a distance between the first face 34 and the second face 36 is between about 24 inches and about 60 inches. A first sealing flange 38 is positioned on the first face 34 and a second sealing flange 40 is positioned on the second face 36. A sealing face plate 41 at the first face 34 is configured to mate to the sorbent cartridges 14 to promote air flow into a desired flow path. The sealing face plate 41 may be removably affixed to the outer frame 16 or may alternatively be permanently fixed to the outer frame 16. While the contactor vessel 12 is illustrated in an open configuration to allow fluid flow from an exterior 42 of the contactor assembly 10 to pass through the first face 34, through the interior 20 of the contactor vessel 12, and through the second face 36, alternatively a closing structure 55 may be provided that selectively blocks such flow.

The interior 20 of the contactor vessel 12 is sized for accommodating one or more of the sorbent bed cartridges 14. The interior 20 may include a single compartment or may alternatively be separated into two or more internal compartments 46 using one or more inner walls 48, to provide modularity and increase structural integrity, or potentially increased structural integrity. The one or more inner walls 48 may be arranged in a variety of configurations to meet the requirements of a particular use. In the illustrated embodiment, for example, the inner walls 48 include a first inner wall 50 that extends from the first outer wall 22 to the second outer wall 24 of the outer frame 16, a second inner wall 52 that extends from the third outer wall 26 of the outer frame 16 to the first inner wall 50, and a third inner wall 54 that extends from the first inner wall 50 to the fourth outer wall 28 of the outer frame 16. Thus, the illustrated arrangement of inner walls 48 divides the interior 20 of the depicted contactor vessel 12 into four isolatable compartments 46. It should be understood that removing the third and fourth inner walls 52, 54 would divide the interior 20 of the contactor vessel 12 into two compartments 46, likewise using a single inner wall 48 that extends from the third outer wall 26 to the fourth outer wall 28 would also divide the interior 20 of the contactor vessel 12 into two compartments 46, and adding more inner walls 48 would further divide the interior 20 of the contactor vessel 12 into more compartments 46. The inner walls 48 of the internal compartments 46 provide structural integrity to the contactor vessel 12 which minimizes weight and cost by reducing the required thickness for outer walls 18 while enabling modularity in the mechanical manufacturing, assembly, and process operation. For example, inflow and outflow from the first and second faces 34, 36 can be targeted or excluded from certain internal compartments 46, such as by using one or more closing structures 55 (one embodiment of a closing structure diagrammatically illustrated in FIG. 1) arranged relative to the respective internal compartments 46 that are to be blocked from fluid flow. For example, a first subset of the internal compartments 46 may be blocked by a closing structure 55 to block fluid flow therethrough while a second subset of the internal compartments 46 may be open to permit fluid flow therethrough. Thus, the internal compartments 46 can be isolated from one another. In an alternative embodiment, one or more of the inner walls 48 need not be solid for isolation. In some cases it is advantageous to not isolate the internal compartments 46 which can be accomplished by perforating one or more of the inner walls 48 with slots or holes to allow air flow or heat communication between compartments 46 while still providing structural support for the contactor assembly 10 and shelving for the cartridges 14.

As further shown in FIG. 3, the contactor vessel 12 may further include one or more cooperating structures 56 to provide a structural surface to mount individual sorbent cartridges 14 within the contactor vessel 12. In the illustrated embodiment, the cooperating structures 56 include shelves or support rails 58 provided on both the third outer wall 26 and the fourth outer wall 28 and extend at least partially from the first face 34 to the second face 36. When an inner wall 48 is included, such as the first inner wall 50, that extends from the first outer wall 22 (top wall) to the second outer wall 24 (bottom wall), then the support rails 56 may further be included on the opposing surfaces of the first inner wall 50 that face the third outer wall 26 and the fourth outer wall 28 to provide support for the sorbent cartridges 14 inserted thereon. The support rails 56 may either be removably affixed to the outer frame 16 and the inner walls 48, or may be permanently fixed thereto. Further, while support rails 56 and shelves have been described, the contactor vessel 12 may further be formed with grooves to accept protrusions on the sorbent cartridges 14. In any of the above-described embodiments, the sorbent cartridges 14 may be received within the contactor vessel 12 using cooperating structures 56 to suitably maintain the sorbent cartridges 14 in position within the contactor vessel 12 during use.

Thermal barriers, shown diagrammatically at 60, may be added internally and/or externally to prevent heat loss external to the vessel 12 and/or radiation from the outer walls 18 of the vessel 12 to the sorbent cartridges 14. In some embodiments, an internal barrier 60 may be a high temperature plastic insert that is mounted to the interior surface of the outer walls 18, while an external thermal barrier 60 may be insulation.

The sorbent cartridges 14 include sorbent beds 70. The sorbent beds 70 include at least one type of sorbent material 72 that is capable of selectively removing CO2 from fluid flow. In a preferred embodiment, the sorbent material is a porous, solid-phase material such as, but not limited to, metal-organic framework ("MOF"), zeolites and mesoporous silicas. Amine impregnated solids may also be considered to increase the CO2 adsorption capacity of porous solid materials. In some embodiments, the sorbent material 72 may have a sorbent particle size with a diameter in a range of about 0.4 mm to about 2.0 mm and a length in a range of about 0.4 mm to about 15.0 mm. Other materials and dimensions not specifically disclosed herein that are capable of removing CO2 from fluid flow may also be used in the sorbent cartridge 14 to take advantage of embodiments of the disclosed invention. Various embodiments of sorbent beds 70 having the sorbent material 72, and various embodiments of sorbent cartridges 14 supporting the sorbent beds 70, will be described further below. Also, the sorbent cartridges 14 could include a single sorbent bed 70 or alternatively multiple sorbent beds 70 made from the same material 72 or made from different materials 72 from each other to provide for layers or stages of CO2 removal.

The sorbent beds 70 include a specified bed thickness, such as, but not restricted to, a range of about 0.5 inches to about 2.5 inches, that can be used to control a variety of process parameters including but not limited to pressure drop, adsorption rate, and adsorption uniformity across the sorbent bed 70. One such embodiment of the sorbent beds 70 includes a variable bed thickness from a first end (an inflow end or front end) to a second end (an outflow end or rear end). Variable bed thickness means that the thickness of the sorbent bed 70 at the first end is smaller or larger than the thickness of the sorbent bed 70 at the second end. More particularly, and in a preferred embodiment, the sorbent beds 70 have a smaller thickness at the first end than at the second end, such as, but not restricted to, a ratio of about 1.1 to about 1.8 between the first end and the second end (where the thickness of the second end is in a range of about 1.1 to about 1.8 times greater than a thickness of the first end). Even more particularly, the thickness of the sorbent beds 70 increases gradually from the first end to the second end. Yet even more particularly, the thickness of the sorbent beds 70 increases substantially uniformly from the first end to the second end. The variable thickness of the sorbent beds 70 can be used to control pressure drop, improve air flow distribution, promote uniform air flow, and promote uniform residence time of fluid (such as air) in contact with the sorbent material 72 of the sorbent beds 70, as compared to a sorbent bed having constant thickness. The sorbent beds 70 also include a fine mesh support 73 (a small portion of a diagrammatic depiction of the fine mesh support 73 shown in FIG. 4), where the fine mesh support 73 can be utilized to surround, such as substantially encase, the sorbent material 72, and the mesh openings in the mesh support 73 are small enough to hold the sorbent particles of the sorbent material 72 within the sorbent beds 70 without passing through the mesh openings.

Figure 4:
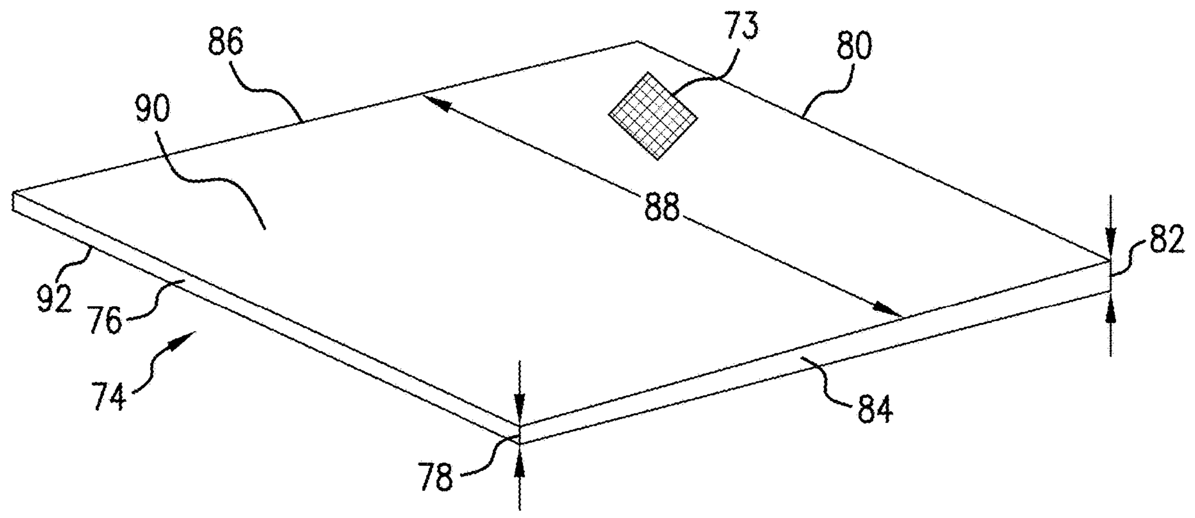
FIG. 4 depicts a perspective view of an embodiment of a sorbent bed for use in a contactor assembly.

As shown in FIG. 4, an embodiment of sorbent bed 74 for a sorbent cartridge 14 includes the sorbent bed 74 that is substantially plate-shaped. The sorbent bed 74 includes a first end 76 having a first thickness 78 and an opposing second end 80 having a second thickness 82, different than the first thickness 78. More particularly, in one embodiment the first thickness 78 is less than the second thickness 82. Also as illustrated, the sorbent bed 74 has a first side 84 and a second side 86, with the width 88 of the sorbent bed 74 being substantially constant from the first side 84 to the second side 86. The sorbent bed 74 also includes a first surface 90 and a second surface 92. In a preferred embodiment, the first surface 90 and the second surface 92 are each substantially planar, but not parallel to each other. Alternatively, in other embodiments one or both of the first surface 90 and the second surface 92 may be curved, indented, or otherwise structured. In a preferred embodiment of utilizing the sorbent bed 74 of FIG. 4 within a sorbent cartridge 14 for the contactor vessel 12, the first end 76 would be positioned closer to the first face 34 of the contactor vessel 12 than the second face 36, and the second end 80 would be positioned closer to the second face 36 of the contactor vessel 12 than the first face 34.

Figure 5:
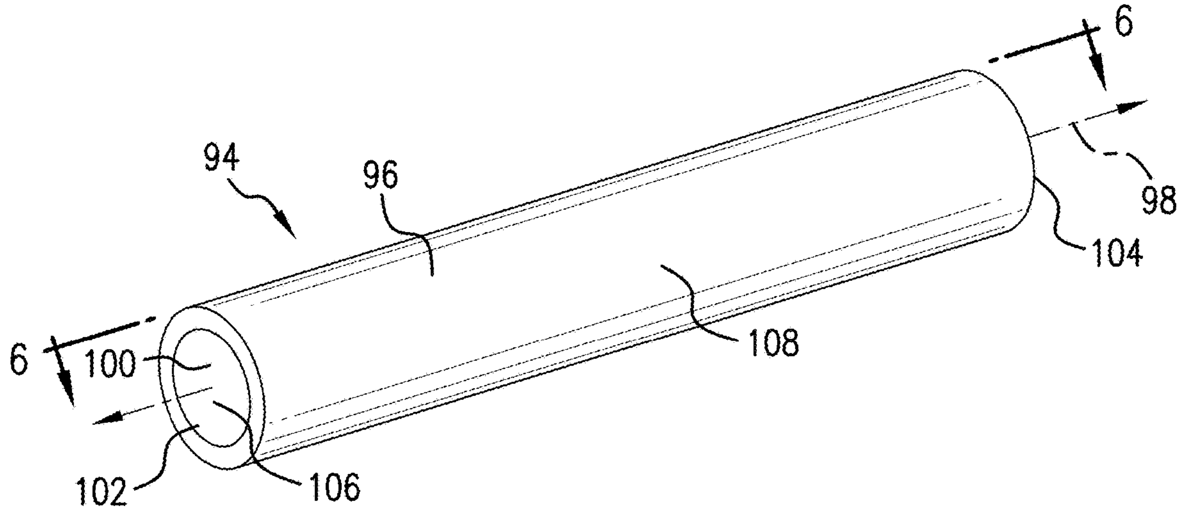
FIG. 5 depicts a perspective view of another embodiment of a sorbent bed for use in a contactor assembly.

As shown in FIG. 5, another embodiment of the sorbent bed 94 for a sorbent cartridge 14 includes a sorbent bed 94 that is annular shaped, with an annular shaped wall 96 surrounding a longitudinal axis 98, or center line, of the sorbent bed 94. The sorbent material 72 of the annular shaped wall 96 surrounds an interior space 100 that extends from a first end 102 to the second end 104. More particularly, as illustrated in FIG. 5 the sorbent bed 94 is cylindrically shaped with an interior surface 106 facing the interior space 100, and an exterior surface 108. Both the interior surface 106 and the exterior surface 108 of the sorbent bed 94 extend from the first end 102 to the second end 104. While a substantially circular cross-section of an annular shaped sorbent bed is depicted in FIG. 5, alternative cross-sections of an annular sorbent bed could also be employed such as, but not limited to elliptical or varying curved peripheries and all polygonal shapes such as rectangular, trapezoidal, etc.

Figure 6:
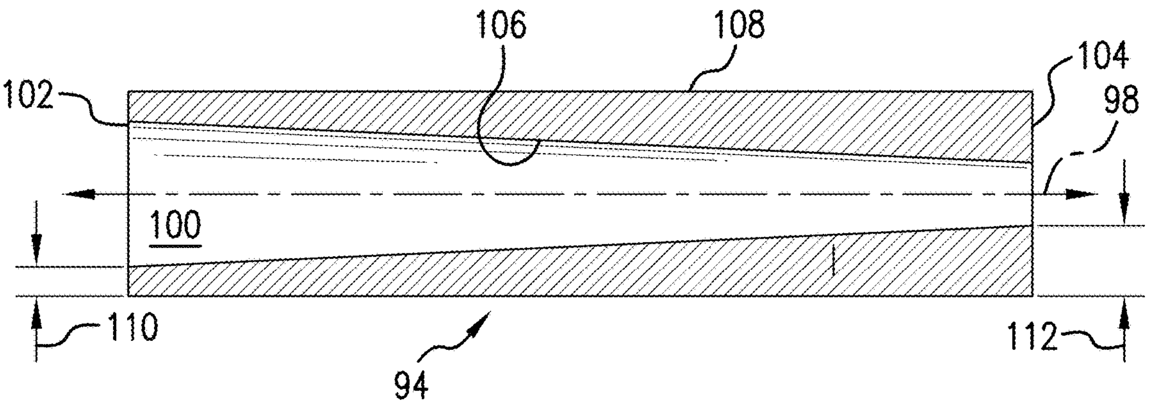
FIG. 6 depicts a sectional view of the sorbent bed of FIG. 5 taken along line 6-6.

As in the sorbent bed 74 of FIG. 4, a first thickness 110 of the sorbent bed 94 of FIG. 5 at the first end 102 is different than a second thickness 112 of the sorbent bed 94 at the second end 104, as shown in FIG. 6. More particularly, the first thickness 110 is less than the second thickness 112. That is, an interior diameter at the first end 102 is greater than an interior diameter at the second end 104. In the embodiment of FIGS. 5-6, the cylindrically shaped sorbent bed 94 has a constant, or at least substantially constant outer diameter. When installed in a contactor vessel 12, fluid flow can enter through the interior space 100 of the sorbent bed 94. Due to the nature of the sorbent material 72, some of the fluid flow will then pass through the annular shaped wall 96 exteriorly of the sorbent bed 94, in a direction extending from the interior surface 106 to the exterior surface 108, before exiting the contactor vessel 12. In the illustrated embodiment, fluid flow enters the interior space 100 at the first end 102 of the sorbent bed 94, where the first thickness 110 of the sorbent bed 94 is smallest as compared to the thickness of the remainder of the sorbent bed 94.

Figure 7:
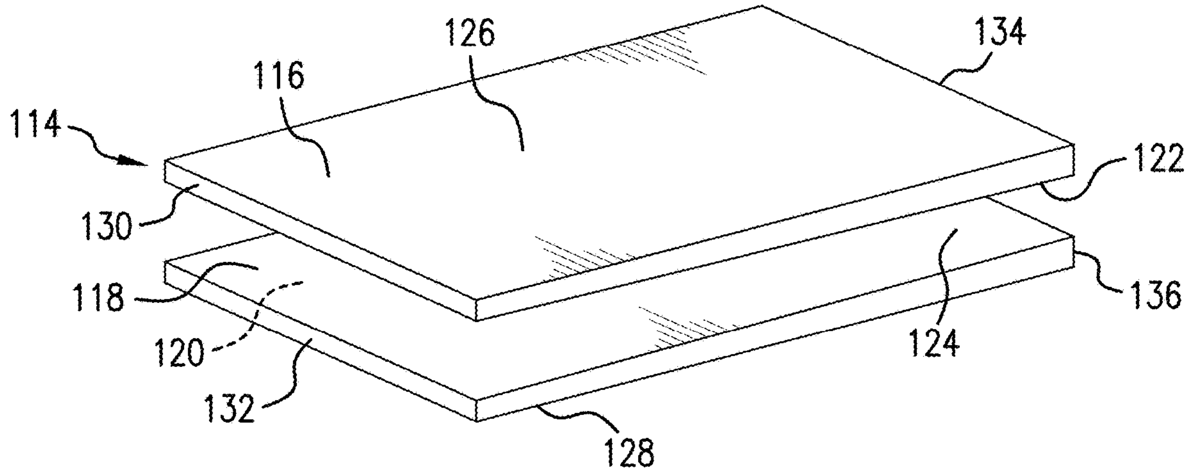
FIG. 7 depicts a perspective of an embodiment of paired sorbent beds as they could be arranged in a sorbent cartridge for use in a contactor assembly.

In another embodiment, as shown in FIG. 7, a configuration for a paired sorbent bed arrangement 114 is shown as they could be arranged in a sorbent cartridge. The sorbent bed arrangement 114 includes more than one spaced sorbent beds 116, 118, such as a pair of sorbent beds having first sorbent bed 116 and second sorbent bed 118 as shown. While two sorbent beds 116 and 118 are illustrated, the sorbent bed arrangement 114 is not limited to two sorbent beds, and may have more than two sorbent beds. In the illustrated embodiment shown in FIG. 7, the sorbent beds 116, 118 are spaced apart by interior space 120, with an interior surface 122 of the first sorbent bed 116 facing an interior surface 124 of the second sorbent bed 118. An exterior surface 126 of the first sorbent bed 116 may, in one embodiment, be substantially parallel to an exterior surface 128 of the second sorbent bed 118. Each of the first and second sorbent beds 116, 118 includes a first end 130, 132, respectively, and a second end 134, 136, respectively. Further, each of the first and second sorbent beds 116, 118 may be shaped similar to or the same as the sorbent bed 74 shown in FIG. 4, wherein a thickness of the sorbent beds 116, 118 is varied between the first ends 130, 132 and the second ends 134, 136. More particularly, the sorbent beds 116, 118 may be substantially plate-shaped and tapered from the second ends 134, 136 to the first ends 130, 132. Due to a greater thickness of the second ends 134, 136 as compared to the first ends 130, 132, and depending on how the first and second beds 116, 118 are arranged relative to each other, the height (the distance between beds 116, 118) of the interior space 120 adjacent the first ends 130, 132 may be greater than the height of the interior space 120 adjacent the second ends 134, 136. While the beds are shown spaced apart, they could also be connected to form a single bed enabling a full annular flow from an inlet face at first ends 130, 132 to an exit face at second ends 134, 136.

Figure 8:
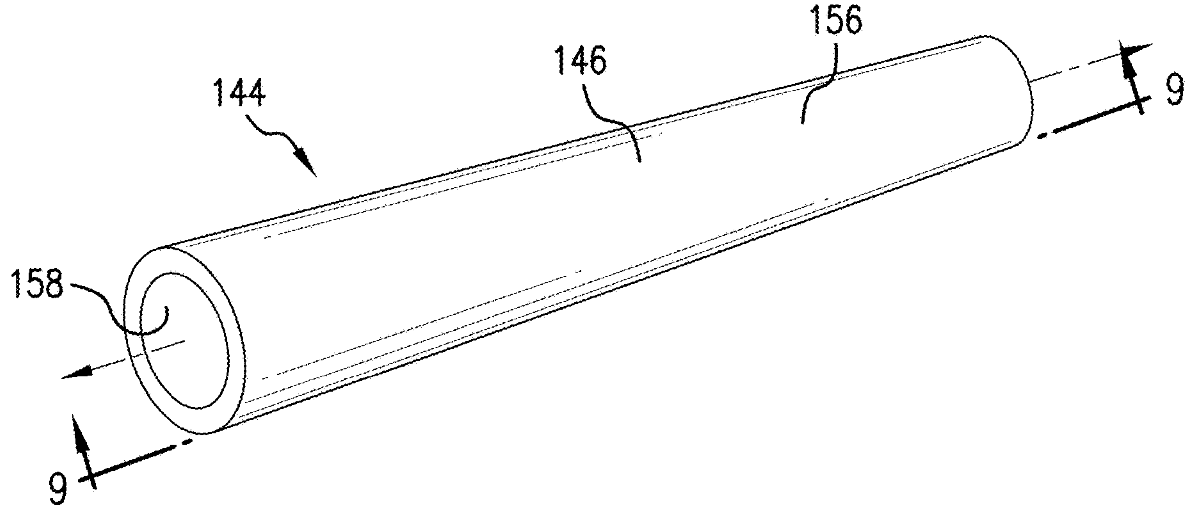
FIG. 8 depicts a perspective view of another embodiment of a sorbent bed for use in a contactor assembly.
Figure 9:
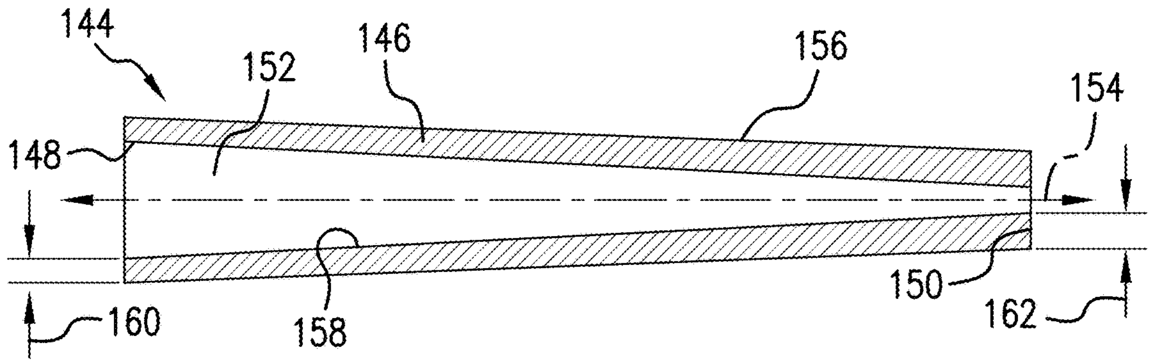
FIG. 9 depicts a sectional view of the sorbent bed of FIG. 8 taken along line 9-9.

An alternate embodiment of an annular-shaped sorbent bed 144 having an annular shaped wall 146 is shown in FIGS. 8-9. The sorbent bed 144 of FIGS. 8-9 is substantially the same as the sorbent bed 94 of FIGS. 5-6 but has a tapered external shape. The tapered shape means that the outer sorbent bed dimension converges or diverges along the length, so the front height is larger or smaller than the rear height. That is, in FIGS. 8-9, a frustoconical annular-shaped sorbent bed 144 has a first end 148 with an outer diameter that is greater than an outer diameter at a second end 150 of the sorbent bed 144. An interior space 152 extends along the longitudinal axis 154, and the sorbent bed 144 includes an exterior surface 156 and an interior surface 158. A first thickness 160 of the sorbent bed 144 at the first end 148 is different than a second thickness 162 of the sorbent bed 144 at the second end 150, and, more particularly the first thickness 160 of the sorbent bed 144 at the first end 148 is less than the second thickness 162 of the sorbent bed 144 at the second end 150. While a substantially circular cross-section of an annular shaped sorbent bed is depicted in FIG. 8, alternative cross-sections of an annular sorbent bed could also be employed such as, but not limited to elliptical or varying curved peripheries and all polygonal shapes such as rectangular, trapezoidal, etc.

Figure 10:
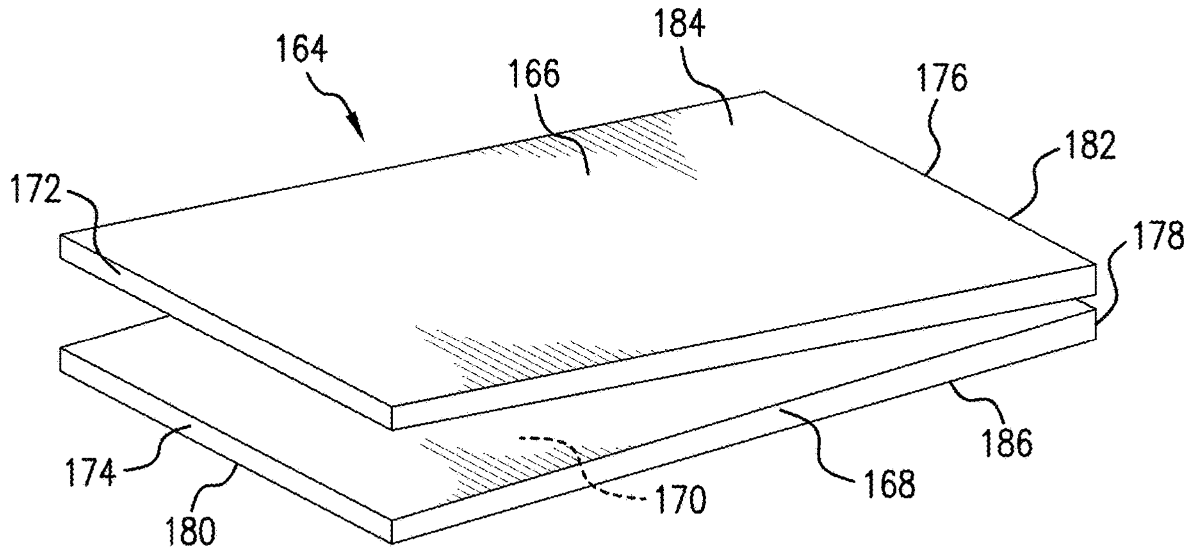
FIG. 10 depicts a perspective view of an embodiment of a paired sorbent beds as they could be arranged in a sorbent cartridge for use in a contactor assembly.

In another embodiment, as shown in FIG. 10, a configuration for a paired sorbent bed arrangement 164 is shown as they could be arranged in a sorbent cartridge. The sorbent bed arrangement 164 includes more than one spaced sorbent beds 166, 168, such as a pair of sorbent beds having first sorbent bed 166 and second sorbent bed 168 as shown. While two sorbent beds 166 and 168 are illustrated, the sorbent bed arrangement 164 is not limited to two sorbent beds, and may have more than two sorbent beds. In the illustrated embodiment shown in FIG. 10, the sorbent beds 166, 168 are spaced apart by interior space 170. Each of the first and second sorbent beds 166, 168 includes a first end 172, 174, respectively, and a second end 176, 178, respectively. Further, each of the first and second sorbent beds 166, 168 may be shaped similar to or the same as the sorbent bed 74 shown in FIG. 4, wherein a thickness of the sorbent beds 166, 168 is varied between the first ends 172, 174 and the second ends 176, 178. More particularly, the sorbent beds 166, 168 may be substantially plate-shaped and tapered from the second ends 176, 178 to the first ends 172, 174. The sorbent bed arrangement 164 is similar to the sorbent bed arrangement 114 of FIG. 7 except that the sorbent bed arrangement 164 of FIG. 10 has a tapered external shape from a first end 180 of the sorbent bed arrangement 164 to a second end 182 of the sorbent bed arrangement 164. Thus, the exterior surface 184 of the first sorbent bed 166 is not parallel to the exterior surface 186 of the second sorbent bed 168, and the first and second sorbent beds 166, 168 are arranged relative to each other such that the second ends 176, 178 are positioned closer to each other than the first ends 172, 174. Further, it is noted that the second ends 176,178 are positioned closer to each other than the second ends 134, 136 shown in the sorbent bed arrangement 114 of FIG. 7. Thus, the height (distance between sorbent beds 166, 168) of the interior space 170 at the first end 180 of the sorbent bed arrangement 164 is greater than the height of the interior space 170 adjacent the second end 182 of the sorbent bed arrangement 164. While the beds are shown spaced apart, they could also be connected to form a single bed enabling a full annular flow from an inlet face at first end 180 to an exit face at second end 182.

Figure 11:
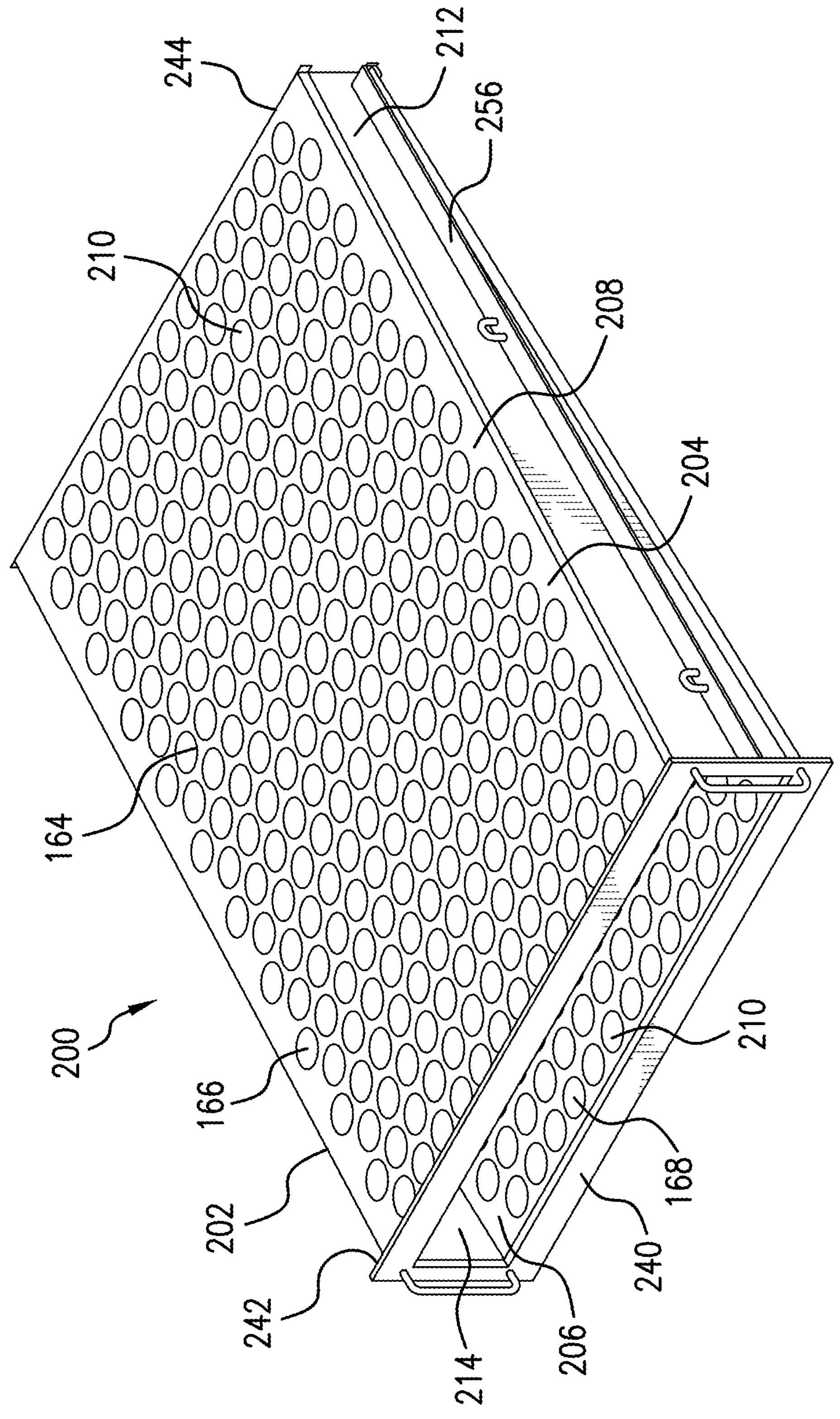
FIG. 11 depicts a perspective view of an embodiment of a sorbent cartridge for use in a contactor assembly.

Turning to FIG. 11, an embodiment of a sorbent cartridge 200 includes the sorbent bed arrangement 164 as previously described with reference to FIG. 10, although other embodiments of the sorbent beds and sorbent bed arrangements described herein are also employable within the sorbent cartridge 200. The sorbent cartridge 200 of these embodiments is an annular flow cartridge including a support structure such as reinforcement 202, having both an external exoskeleton 204 and an internal structure 206 for mechanical integrity. (In some embodiments, the reinforcement 202 is in addition to the mesh support 73 depicted in FIG. 4 and as described with respect to the sorbent beds 70.) The reinforcement 202 includes an exoskeleton 204 and internal structure 206 for the first sorbent bed 166, and an exoskeleton 204 and an internal structure 206 for the second sorbent bed 168. The reinforcement 202 further includes first and second side supports 212, 214 that space the exoskeleton 204 and internal structure 206 for the first sorbent bed 166 from the exoskeleton 204 and internal structure 206 for the second sorbent bed 168. One or both of the first and second side supports 212, 214 may include a cooperating structure 256, such as a rail, to engage with the cooperating structure 56 of the contactor vessel 12.

The exoskeleton 204 includes a support material 208 having a plurality of openings 210. The exoskeleton 204 covers a first percentage of the exterior surfaces 184, 186 of the sorbent bed arrangement 164 with the support material 208 to increase the rigidity of the cartridge 200, but also exposes a second percentage of the exterior surfaces 184, 186 of the sorbent bed arrangement 164 with the openings 210 to minimize pressure drop and enable intimate fluid contact with the sorbent material 72 without stagnation zones as well as plenty of escape paths for remaining fluid to pass through the sorbent material 72. As shown in FIG. 11, the second percentage of the exterior surfaces 184, 186 of the sorbent bed arrangement 164 that is exposed by the openings 210 of the exoskeleton 204 to surrounding fluid flow is greater than the first percentage of the exterior surfaces 184, 186 of the sorbent bed arrangement 164 that is surrounded or otherwise covered by the support material 208 of the exoskeleton 204. The openings in the mesh support 73 are smaller than in the reinforcement 202.

The internal structure 206 of the reinforcement 202 supports the interior surfaces of the sorbent beds 166, 168. As with the exoskeleton 204, the internal structure 206 includes support material 208 that can be formed with a plurality of openings 210. The internal structure 206 is sized to internally cover a first percentage of the interior surfaces of the sorbent beds 166, 168 such that the support material 208 of the internal structure 206 increases the rigidity of the cartridge 200, but also exposes a second percentage of the interior surfaces of the sorbent beds 166, 168 with the openings 210 to minimize pressure drop and enable intimate fluid contact with the sorbent bed arrangement 164 (FIG. 10) without stagnation zones. In the illustrated embodiment of FIG. 11, the second percentage of the interior surfaces of the sorbent beds 166, 168 that is exposed by the openings 210 of the internal structure 206 is greater than the first percentage of the interior surfaces of the sorbent beds 166, 168 that are covered by the support material 208 of the internal structure 206.

Figure 12:
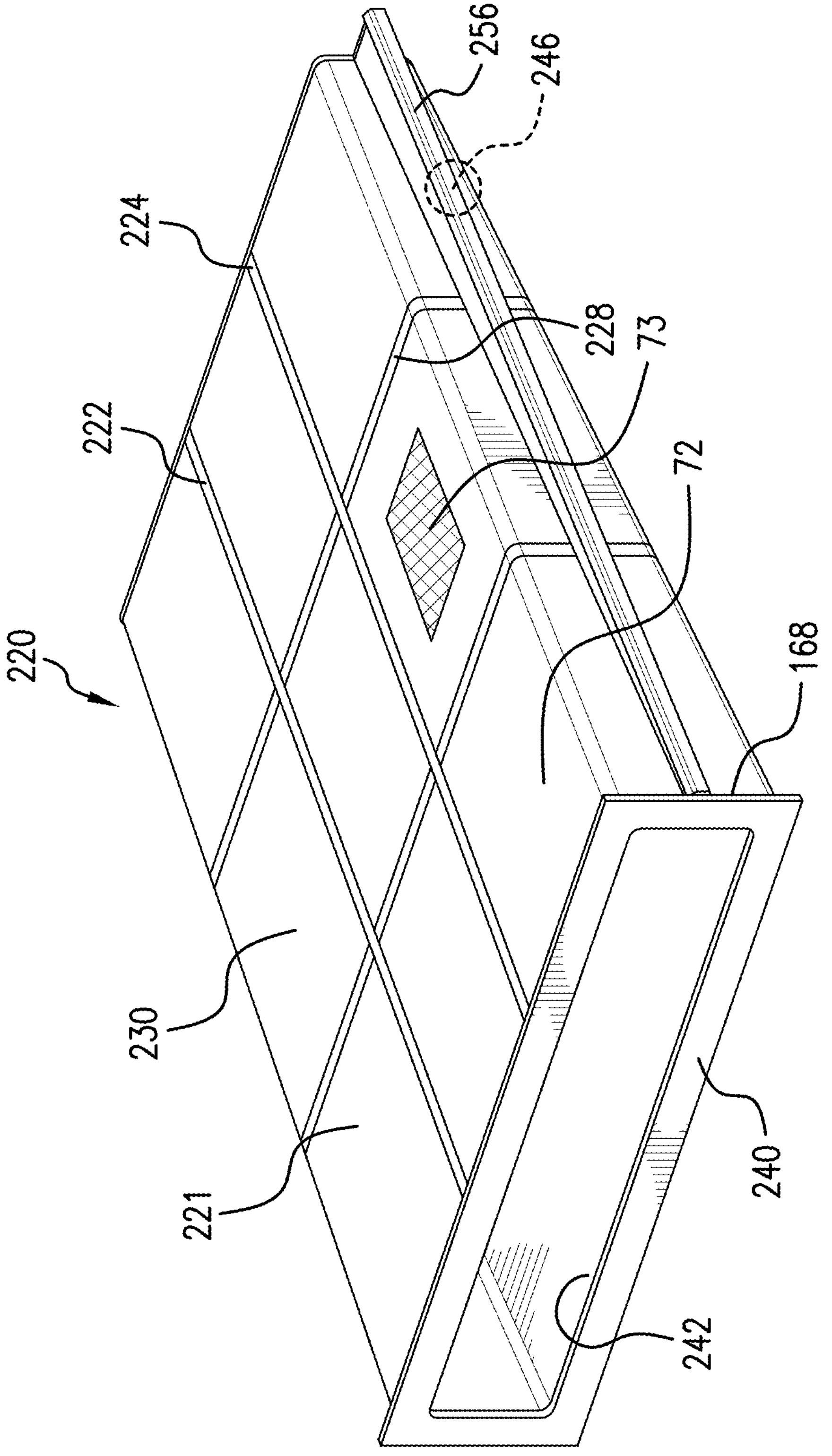
FIG. 12 depicts a perspective view of another embodiment of a sorbent cartridge for use in a contactor assembly.

Turning to FIG. 12, an embodiment of a sorbent cartridge 220 includes a sorbent bed 221 incorporating features including the varied thickness of the sorbent bed as described with respect to FIG. 4 and having an annular and tapered shape as described with respect to FIG. 8, but with a rectangular cross-section, although other embodiments of the sorbent bed described herein are also employable as the sorbent bed within the sorbent cartridge 220. The sorbent cartridge 220 of these embodiments is an annular flow cartridge including reinforcement 222, having an external exoskeleton 224 for mechanical integrity, and may further include an internal structure (not shown). The exoskeleton 224 includes a support material 228 that can be formed of straps or support bars as shown in FIG. 12 having a plurality of openings 230. The exoskeleton 224 surrounds a first percentage of the exterior surface of the sorbent bed 221 with the support material 228 to increase the rigidity of the cartridge 220, but also exposes a second percentage of the exterior surface of the sorbent bed 221 with the openings 230 to minimize pressure drop and enable intimate fluid contact with the sorbent material 72 without stagnation zones as well as plenty of escape paths for remaining fluid to pass through the sorbent material 72. As described in reference to FIG. 4, a fine mesh support 73 (a small portion of which is diagrammatically depicted in FIG. 12) may be utilized to surround, such as substantially encase, the sorbent material 72, and the mesh openings in the mesh support 73 are small enough to hold the sorbent particles of the sorbent material 72 within the sorbent beds 70 without passing through the mesh openings. As also shown in FIG. 12, the second percentage of the exterior surface of the sorbent bed 221 that is exposed by the openings 230 of the exoskeleton 224 to surrounding fluid flow is greater than the first percentage of the exterior surface of the sorbent bed 221 that is surrounded by the support material 228 of the exoskeleton 224.

The internal structure of the reinforcement 222 may support the interior surface of the sorbent bed 221. As with the exoskeleton 224, the internal structure may include support material 228 that can be formed of straps or support bars as shown in FIG. 12. The internal structure may be sized and placed to increase the rigidity of the cartridge 220, but also expose the interior surface of the sorbent bed 221 with the openings 230 to minimize pressure drop and enable intimate fluid contact with the sorbent bed 164 without stagnation zones.

In the illustrated embodiments of FIGS. 11 and 12, the sorbent bed cartridge 200, 220 further includes a front or first sealing plate 240 at the first end 180 of the sorbent bed arrangement 164 and first end of sorbent bed 221. The first sealing plate 240 can be integral with the internal structure 206 as shown in FIG. 11, or may be attached to one or both of the internal structure 206 and the exoskeleton 204, 224 before or after assembly of the reinforcement 202, 222 with the sorbent bed arrangement 164 and sorbent bed 221. The first sealing plate 240 may be used to assist insertion of the sorbent cartridge 200, 220 into the contactor vessel 12, and may further include a seal 242 (mateable with the first sealing face plate 41 shown in FIG. 3) to promote air flow through the sorbent cartridge 200, 220 into the desired interior space without leakage.

The sorbent cartridge 200, 220 may further include a rear or second sealing plate 244 (see FIG. 11), which may be removable, to enable ease of loading or unloading the sorbent bed arrangement 164 into the cartridge 200, 220. In other embodiments, roller wheels 246 (one shown in phantom in FIG. 12) can be included on opposing sides of the sorbent cartridge 200, 220 to ease assembly and disassembly into the contactor vessel 12, such as by rolling the sorbent cartridge 200, 220 into place along the rails 58 of the contactor vessel 12 (FIG. 3). The roller wheels 246 are one type of external cooperating structure 256 that can be engaged with cooperating structure 56 in the contactor vessel. Alternative external cooperating structures 256 such as rail-accepting channels or shelf-aligning protrusions can be added to the sides of the sorbent bed cartridge 200, 220 to mate with the cooperating structure 56 of the contactor vessel 12, such as, but not limited to, rails, shelves, and grooves. The above-described features of a sorbent cartridge 200, 220 can be applied to accommodate various sorbent bed arrangements including a plurality of sorbent beds such as shown in FIGS. 7 and 10, annular flow sorbent beds, such as shown in FIGS. 5 and 8, of various shapes such as, but not limited to, cylindrical, rectangular, hexagonal, etc. and also to singular plate-shaped sorbent beds, such as shown in FIG. 4.

While the above-described embodiments have described different embodiments of a cartridge 14 having reinforcements and/or frames and support walls for use in the contactor vessel 12, alternatively a cartridge 14 could include a self-supported sorbent bed, having one or more of the various features of sorbent beds described herein. In one embodiment, the self-supported sorbent bed could include a monolith of adsorbent. As in the previously described embodiments, the cartridge 14 having the self-supported sorbent bed, can be sized to fit within the contactor vessel 12, where the contactor vessel 12 includes a cooperating structure 56 sized to adequately support the cartridge 14 therein.

Also, it should be understood that the cartridges are not limited by orientation. For example, vertically orientated cartridges are within the scope of these embodiments. In a vertically orientated embodiment, the side support walls of the cartridges may be open, or otherwise have openings, to permit pellets (e.g. MOF pellets) to fall through by gravity.

Figure 13:
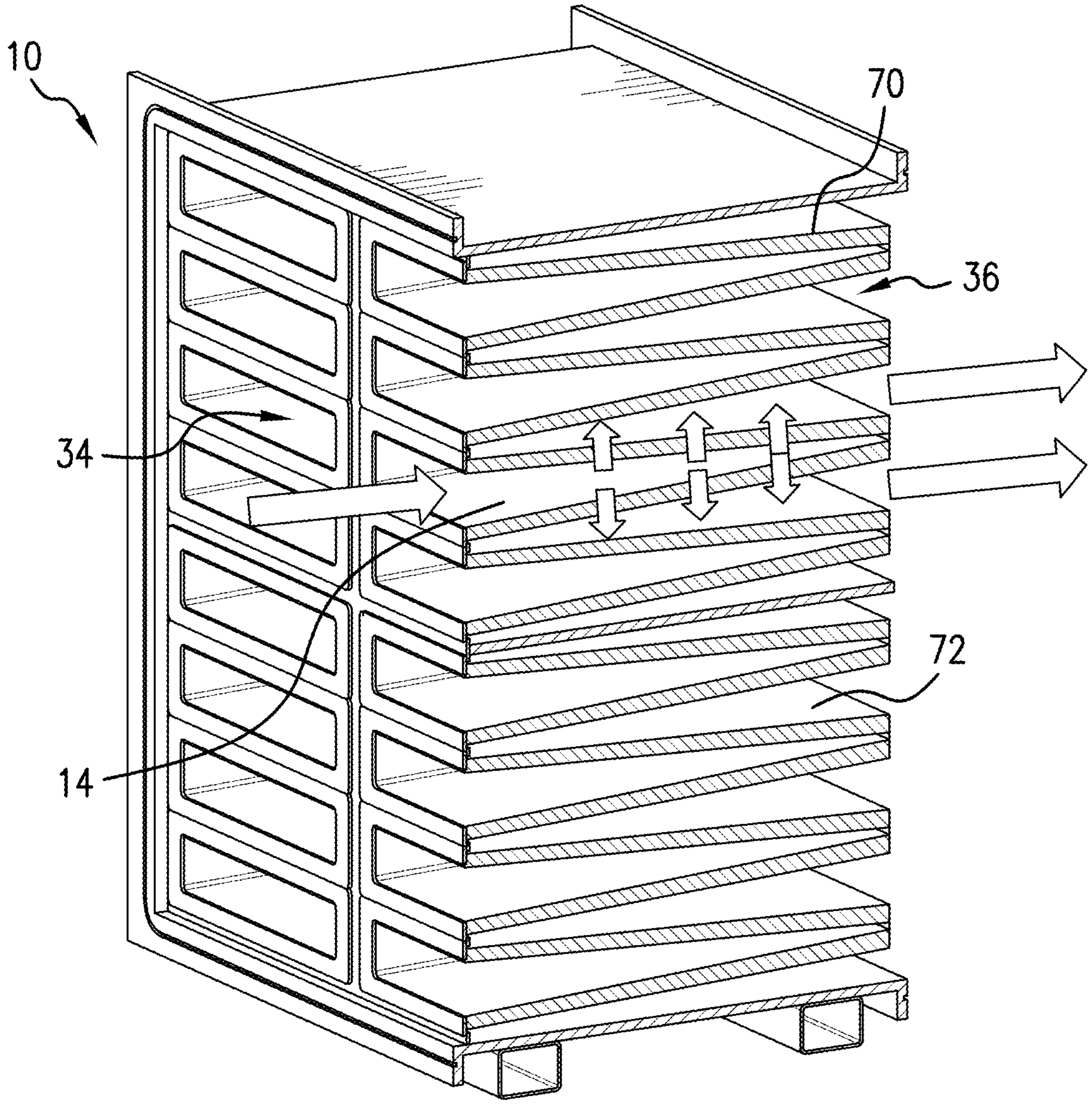
FIG. 13 diagrammatically depicts fluid flow through an embodiment of a contactor assembly.
Figure 14:
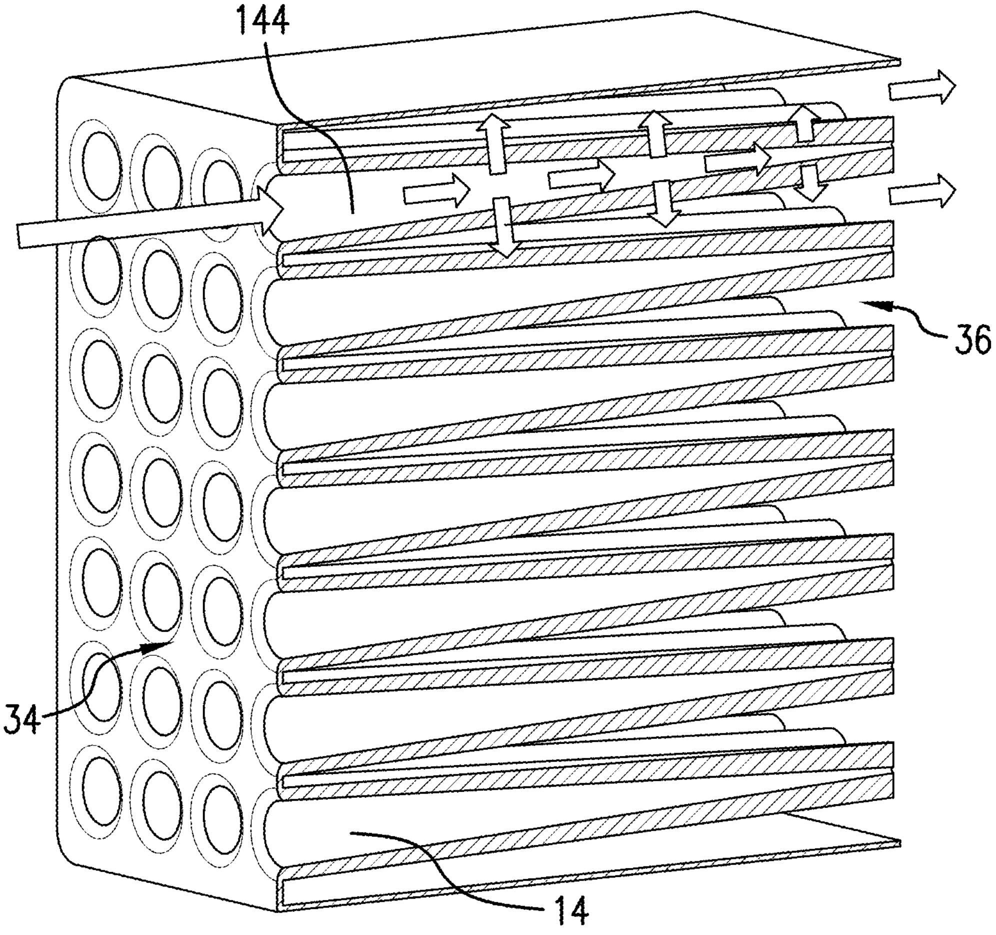
FIG. 14 diagrammatically depicts fluid flow through another embodiment of a contactor assembly.
Figure 15:
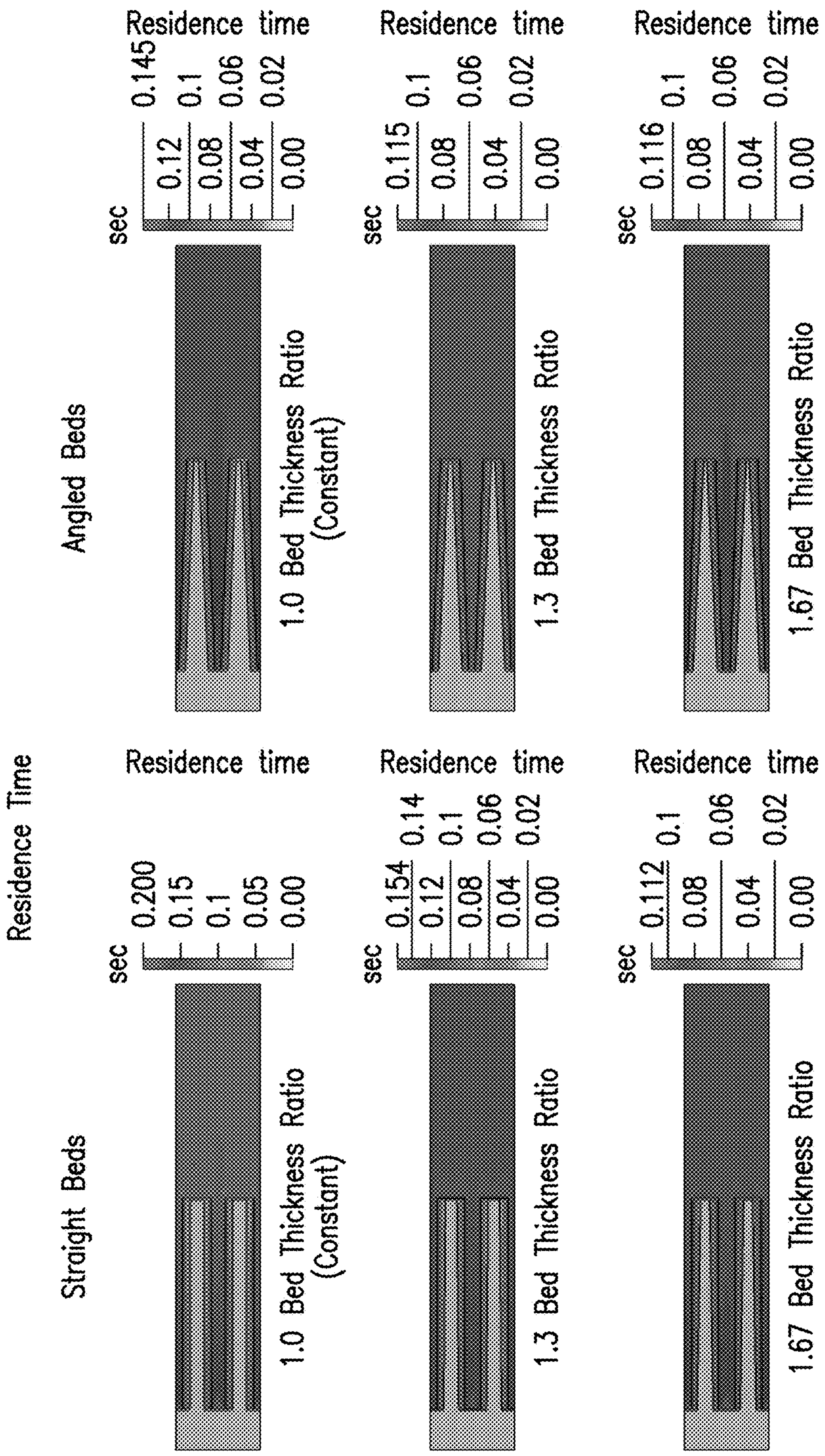
FIG. 15 depicts results of a comparative flow study measuring residence time.
Figure 16:
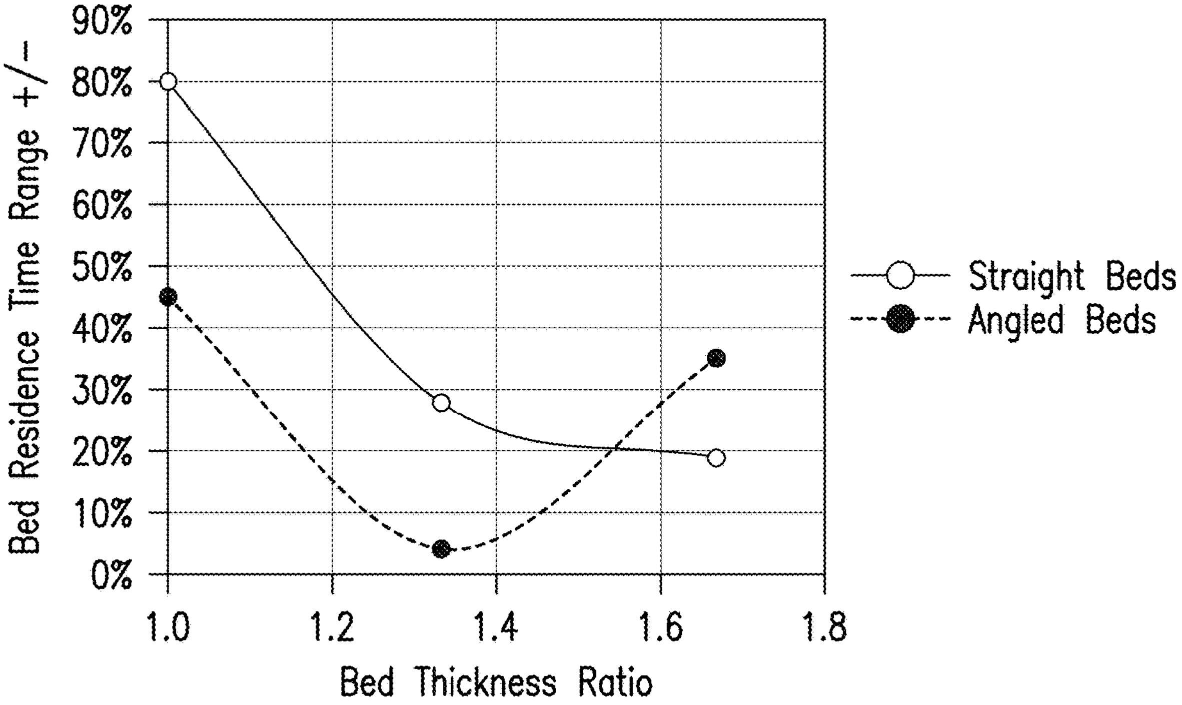
FIG. 16 depicts the results of FIG. 15 in graph form.
Figure 17:
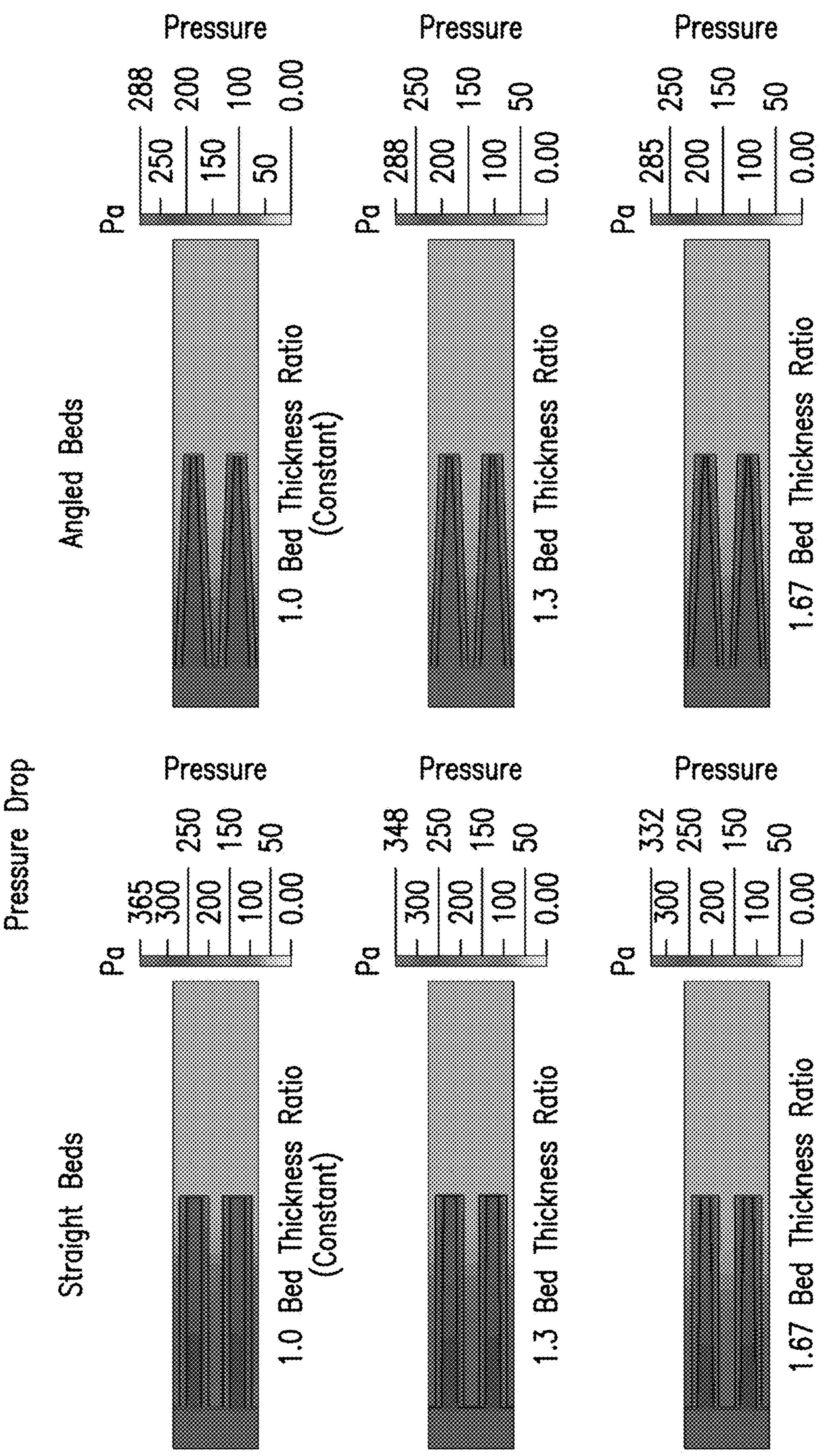
FIG. 17 depicts results of a comparative flow study measuring pressure drop.
Figure 18:
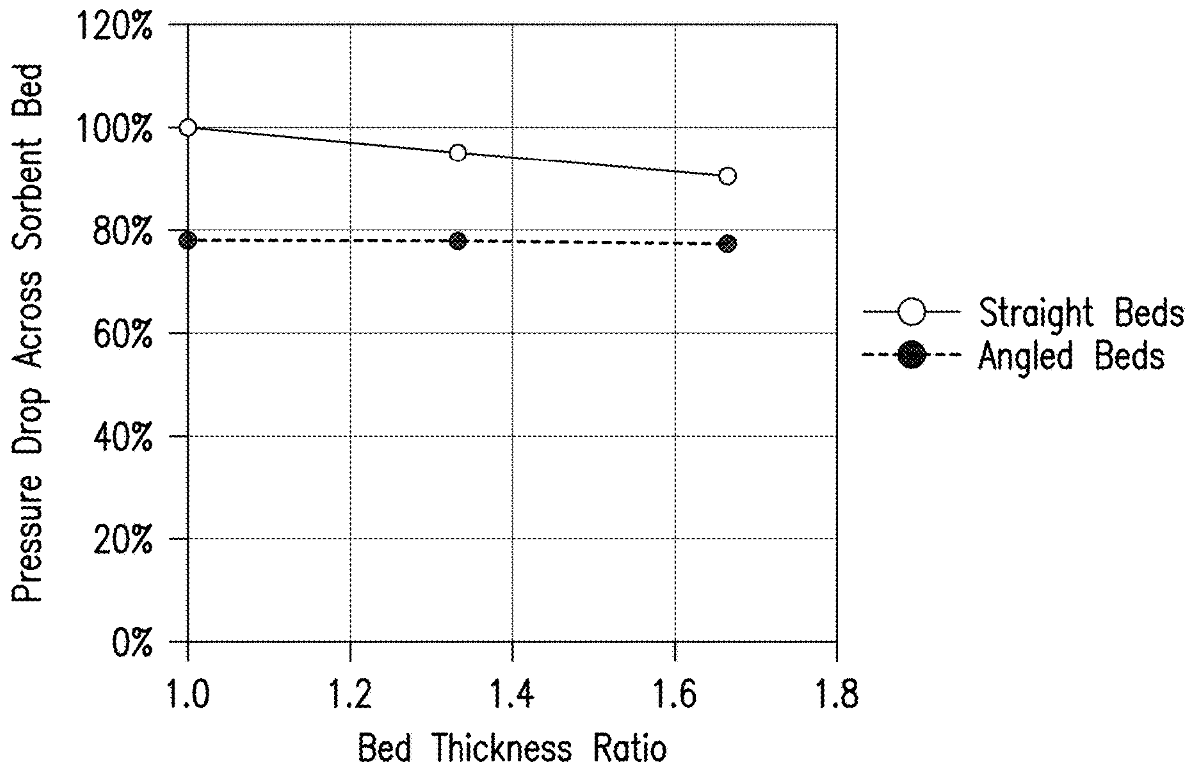
FIG. 18 depicts the results of FIG. 17 in graph form.

FIGS. 13 and 14 diagrammatically demonstrate fluid flow through a contactor assembly 10. The embodiment of FIG. 13 demonstrates the fluid flow through a sorbent cartridge 14 such as any of the cartridges described with respect to FIGS. 11-12, while the embodiment of FIG. 14 demonstrates fluid flow through a sorbent cartridge 14 having a sorbent bed 144 with a frustoconical shape such as shown in FIGS. 8-9. The fluid flow directions would be substantially the same with the other sorbent beds and embodiments disclosed herein. Fluid flow enters the contactor assembly 10 at the first face 34, enters the interior space of the sorbent cartridge 14, passes through the sorbent bed(s) of the sorbent cartridge 14, then exits the contactor assembly 10 through the second face 36 of the contactor assembly 10. It should be understood that while only a few arrows are depicted to demonstrate fluid through the sorbent material 72 of the sorbent beds 70, the fluid can pass through the sorbent beds 70 at any location along the length of the sorbent beds 70. The fluid flow path exiting the contactor assembly 10 through the second face 36 exits in a direction substantially parallel to, but longitudinally offset from, the longitudinal axis of the respective sorbent cartridge 14. Also, prior to exiting the second face 36 of the contactor assembly 10, the fluid flow that passes exteriorly of a sorbent cartridge 14 enters a space within the contactor assembly 10 that may be shared with other exiting fluid flows that pass exteriorly from adjacent sorbent cartridges 14.

With reference now to FIGS. 15-18, the sorbent beds of the above-described embodiments minimize residence time range (increase residence time uniformity) to promote uniform $CO_2$ uptake across the beds for higher $CO_2$ capture efficiency, and minimize pressure drop (lower pressure drop) to reduce energy consumption requirements. A study was conducted to evaluate the flow characteristics of air across different sample sorbent bed sizes and angles, comparing straight ("S") sorbent beds (beds at a zero degree angle relative to the direction of air inflow) to angled ("A") sorbent beds (beds at a non-zero angle relative to the direction of air inflow), each with different levels of bed thickness taper. For the purposes of the experiment, beds having a constant ("C") bed thickness of 4 cm for a 1.0 bed thickness ratio were compared to beds having a variable ("V1") tapered bed thickness from 3.5 cm (at a first end) to 4.5 cm (at a second end) for an approximate 1.3 bed thickness ratio and to beds having a variable ("V2") tapered bed thickness from 3 cm (at a first end) to 5 cm (at a second end) for an approximate 1.7 bed thickness ratio, and these three differently tapered beds (C, V1, V2) were tested in "straight" (S) and "angled" (A) configurations relative to air flow at the first end of a contactor vessel. With regards to residence time, it was found that tapering the bed thickness (V1, V2) significantly increased residence time uniformity for both straight (S) and angled (A) beds as compared to beds having a constant (C) bed thickness (specifically 80%, 28%, 19% bed residence time range in S-C, S-V1, S-V2, respectively and 45%, 4%, 35% bed residence time range in A-C, A-V1, A-V2, respectively). As A-V1 bed performed better than the A-V2 bed for bed residence time range, optimizing the bed thickness taper for a particular configuration will produce the best results. With regards to pressure drop, the goal is to minimize pressure drop to reduce energy consumption requirements. The angled beds (A) produced significantly lower pressure drop (0.783, 0.781, 0.775 bed pressure drop for A-C, A-V1, A-V2, respectively) as compared to the straight beds (S) (1.0, 0.951, 0.906 bed pressure drop for S-C, S-V1, S-V2, respectively), with the straight tapered beds (S-V1, S-V2) moderately lowering the pressure drop as compared straight constant beds (S-C), and with angled tapered beds (A-V1, A-V2) slightly lowering the pressure drop as compared to angled constant beds (A-C). The following table summarizes the results of the experiment.

| Bed Orientation | Bed Thickness Ratio | Bed Residence Time Range | $\Delta P/\Delta P_{StrConst}$ |
|---|---|---|---|
| Straight | 1.0 | 80.0% | 1.000 |
| Straight | ±1.3 | 28.0% | 0.951 |
| Straight | ±1.67 | 19.0% | 0.906 |
| Angled | 1.0 | 45.0% | 0.783 |
| Angled | ±1.3 | 4.0% | 0.781 |
| Angled | ±1.67 | 35.0% | 0.775 |

Unlike sorbent beds having planar surfaces with constant bed thickness, the embodiments of sorbent beds 70 disclosed herein include sorbent beds 70 with a variable thickness from a first end to a second end in the direction of fluid flow, and in some embodiments with a tapered external shape as well which further improves flow characteristics and uniformity. The modular, removable cartridges are compactly arranged in the contactor vessel 12, maximizing sorbent volume, and improving the assembly of the contactor assembly 10 and maintenance thereof. The novel embodiments of the sorbent cartridge 14 includes features that improve mechanical integrity while maintaining flow performance. The combined features improve carbon capture, such as direct air capture ("DAC"), plant performance by maximizing $CO_2$ capture rate, minimizing energy usage, minimizing cost, and maximizing plant uptime. The modularity of mechanical features enables turn-down operability of single units and ease of scale-up for large carbon capture systems.

Set forth below are some embodiments of the foregoing disclosure:

Embodiment 1: A contactor assembly configured to capture $CO_2$ from a fluid flow, the contactor assembly including a sorbent bed, the sorbent bed including a $CO_2$ adsorbent material and having a first end and a second end, wherein a thickness of the sorbent bed is varied between the first end and the second end.

Embodiment 2: The contactor assembly of any prior embodiment, wherein the sorbent bed is substantially plate-shaped and tapered from the second end to the first end.

Embodiment 3: The contactor assembly of any prior embodiment, wherein the thickness of the sorbent bed at the first end is different than a thickness of the sorbent bed at the second end, and further including a contactor vessel configured to support the sorbent bed therein, the contactor vessel having a first face arranged to receive the fluid flow and a second face, wherein the first end of the sorbent bed is arranged adjacent the first face of the contactor vessel and the second end of the sorbent bed is arranged adjacent the second face of the contactor vessel.

Embodiment 4: The contactor assembly of any prior embodiment, wherein the sorbent bed includes a monolith of adsorbent material removably positionable within the contactor vessel.

Embodiment 5: The contactor assembly of any prior embodiment, wherein the sorbent bed is housed in a sorbent cartridge removably receivable within the contactor vessel.

Embodiment 6: The contactor assembly of any prior embodiment, wherein at least one of the sorbent cartridge and the contactor vessel include a cooperating structure to enable the sorbent cartridge to be slidably received within the contactor vessel.

Embodiment 7: The contactor assembly of any prior embodiment, wherein the sorbent cartridge further includes a reinforcement having a support material partially surrounding the sorbent bed and openings in the reinforcement permitting fluid flow access to the sorbent bed.

Embodiment 8: The contactor assembly of any prior embodiment, wherein the sorbent cartridge includes a sealing plate engageable with a sealing face plate of the contactor vessel.

Embodiment 9: The contactor assembly of any prior embodiment, wherein the sorbent cartridge includes a flange at a first end of the sorbent cartridge, the flange configured to seal with a sealing surface on the first face of the contactor vessel.

Embodiment 10: The contactor assembly of any prior embodiment, wherein the sorbent bed is a first sorbent bed, and further comprising a sorbent cartridge and a second sorbent bed, wherein the first and second sorbent beds are spaced apart within the sorbent cartridge to form an interior space sized to permit the fluid flow therein.

Embodiment 11: The contactor assembly of any prior embodiment, wherein the first and second sorbent beds are at a non-zero angle with respect to each other.

Embodiment 12: The contactor assembly of any prior embodiment, wherein the sorbent bed includes an annular-shaped wall and a thickness of the wall is tapered from the second end to the first end.

Embodiment 13: The contactor assembly of any prior embodiment, further comprising a contactor vessel, the contactor vessel sized to receive the sorbent cartridge therein, wherein the fluid flow passes through the interior space between the first and second sorbent beds, then through the first and second sorbent beds prior to exiting the contact vessel.

Embodiment 14: A method of reducing pressure drop of fluid flow through the contactor assembly of any prior embodiment, the contactor assembly having a contactor vessel including a first face arranged to receive the fluid flow and a second face, the method including arranging a sorbent cartridge in the contactor vessel, the sorbent cartridge including the sorbent bed, arranging the sorbent cartridge including positioning the first end of the sorbent bed adjacent the first face of the contactor vessel and positioning the second end of the sorbent bed adjacent the second face of the contactor vessel, wherein the fluid flow received in the sorbent cartridge passes through the sorbent bed and exits through the second face of the contactor vessel.

Embodiment 15: A contactor assembly configured to capture CO2 from a fluid flow, the contactor assembly including a sorbent bed, the sorbent bed including a CO2 adsorbent material and having a first end and a second end, a contactor vessel configured to removably support the sorbent bed therein, the contactor vessel having a first face arranged to receive the fluid flow and a second face, wherein the first end of the sorbent bed is arranged adjacent the first face of the contactor vessel and the second end of the sorbent bed is arranged adjacent the second face of the contactor vessel, and at least one inner wall within the contactor vessel configured to divide the contactor vessel into a plurality of compartments, wherein the contactor vessel is sized to receive a plurality of the sorbent beds within each compartment.

Embodiment 16: A sorbent cartridge configured for insertion in a contactor vessel, the sorbent cartridge including a sorbent bed, the sorbent bed including a CO2 adsorbent material, a first end, and a second end, wherein a thickness of the sorbent bed at the first end is less than a thickness of the sorbent bed at the second end.

Embodiment 17: The sorbent cartridge of any prior embodiment, wherein the sorbent bed is substantially plate-shaped and tapered from the second end to the first end.

Embodiment 18: The sorbent cartridge of any prior embodiment, wherein the sorbent bed includes an annular-shaped wall and a thickness of the wall is tapered from the second end to the first end.

Embodiment 19: The sorbent cartridge of any prior embodiment, wherein the sorbent bed is a first sorbent bed, and further comprising a second sorbent bed, wherein the first and second sorbent beds are spaced apart within a support frame of the sorbent cartridge to form an interior space sized to permit the fluid flow therein.

Embodiment 20: The sorbent cartridge of any prior embodiment, wherein the first and second sorbent beds are at a non-zero angle with respect to each other.

The use of the terms “a” and “an” and “the” and similar referents in the context of describing the invention (especially in the context of the following claims) are to be construed to cover both the singular and the plural, unless otherwise indicated herein or clearly contradicted by context. Further, it should be noted that the terms “first,” “second,” and the like herein do not denote any order, quantity, or importance, but rather are used to distinguish one element from another. The terms “about”, “substantially” and “generally” are intended to include the degree of error associated with measurement of the particular quantity based upon the equipment available at the time of filing the application. For example, “about” and/or “substantially” and/or “generally” can include a range of ±8% of a given value.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A contactor assembly configured to capture CO2 from a fluid flow, the contactor assembly including:

a sorbent bed, the sorbent bed including a CO2 adsorbent material and having a first end and a second end;

wherein a thickness of the sorbent bed is varied between the first end and the second end, and wherein the sorbent bed is a first sorbent bed, and further comprising a sorbent cartridge and a second sorbent bed, wherein the first and second sorbent beds are spaced apart within the sorbent cartridge to form an interior space sized to permit the fluid flow therein.

2. The contactor assembly of claim 1, wherein at least one of the first or second sorbent beds is substantially plate-shaped and tapered from the second end to the first end.

3. The contactor assembly of claim 1, wherein the thickness of at least one of the first or second sorbent beds at the first end is different than a thickness of the sorbent bed at the second end, and further including a contactor vessel configured to support the sorbent bed therein, the contactor vessel having a first face arranged to receive the fluid flow and a second face, wherein the first end of the sorbent bed is arranged adjacent the first face of the contactor vessel and the second end of the sorbent bed is arranged adjacent the second face of the contactor vessel.

4. The contactor assembly of claim 3, wherein at least one of the first or second sorbent beds includes a monolith of adsorbent material removably positionable within the contactor vessel.

5. The contactor assembly of claim 3, wherein at least one of the sorbent cartridge and the contactor vessel include a cooperating structure to enable the sorbent cartridge to be slidably received within the contactor vessel.

6. The contactor assembly of claim 3, wherein the sorbent cartridge further includes a reinforcement having a support material partially surrounding the sorbent bed and openings in the reinforcement permitting fluid flow access to the sorbent bed.

7. The contactor assembly of claim 3, wherein the sorbent cartridge includes a sealing plate engageable with a sealing face plate of the contactor vessel.

8. The contactor assembly of claim 3, wherein the sorbent cartridge includes a flange at a first end of the sorbent cartridge, the flange configured to seal with a sealing surface on the first face of the contactor vessel.

9. The contactor assembly of claim 1, wherein the first and second sorbent beds are at a non-zero angle with respect to each other.

10. The contactor assembly of claim 1, further comprising a contactor vessel, the contactor vessel sized to receive the sorbent cartridge therein, wherein the fluid flow passes through the interior space between the first and second sorbent beds, then through the first and second sorbent beds prior to exiting the contactor vessel.

11. A method of reducing pressure drop of fluid flow through the contactor assembly of claim 1, the contactor assembly having a contactor vessel including a first face arranged to receive the fluid flow and a second face, the method comprising:

arranging a sorbent cartridge in the contactor vessel, the sorbent cartridge including the sorbent beds, arranging the sorbent cartridge including positioning the first ends of the sorbent beds adjacent the first face of the contactor vessel and positioning the second ends of the sorbent beds adjacent the second face of the contactor vessel;

wherein the fluid flow received in the sorbent cartridge passes through the sorbent beds and exits through the second face of the contactor vessel.

12. A sorbent cartridge configured for insertion in a contactor vessel, the sorbent cartridge comprising:

a sorbent bed, the sorbent bed including:

a CO2 adsorbent material;

a first end; and a second end;

wherein a thickness of the sorbent bed at the first end is less than a thickness of the sorbent bed at the second end; and wherein the sorbent bed is a first sorbent bed, and further comprising a second sorbent bed, wherein the first and second sorbent beds are spaced apart within a support frame of the sorbent cartridge to form an interior space sized to permit the fluid flow therein.

13. The sorbent cartridge of claim 12, wherein at least one of the first or second sorbent bed is substantially plate-shaped and tapered from the second end to the first end.

14. The sorbent cartridge of claim 12, wherein the first and second sorbent beds are at a non-zero angle with respect to each other.

* * * * *